May 11, 1937. J. C. THOM 2,079,778
APPARATUS FOR INSERTING ARTICLES IN CONTAINERS
Filed Aug. 7, 1934 10 Sheets-Sheet 1
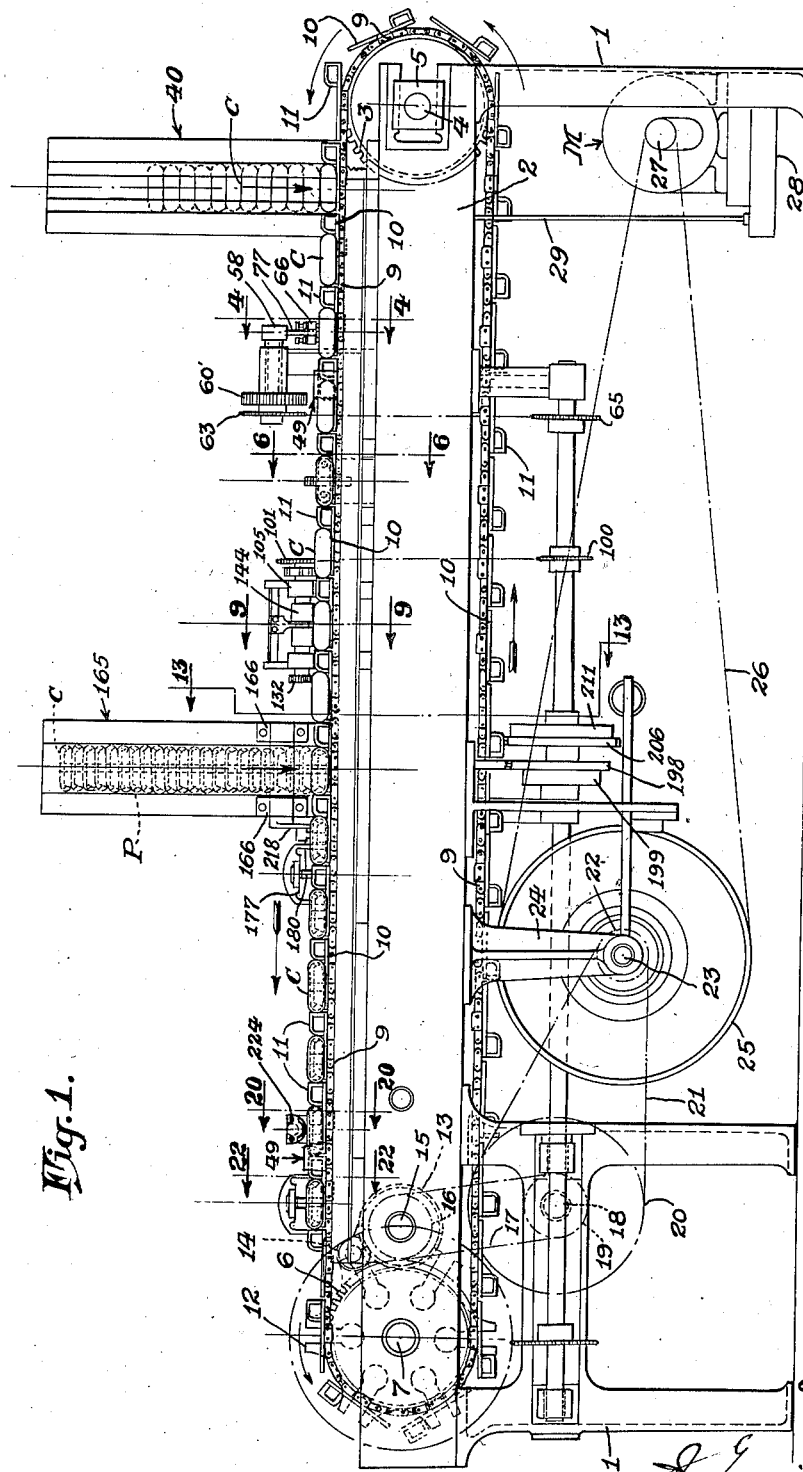
INVENTOR.
James C. Thom
BY
ATTORNEY.

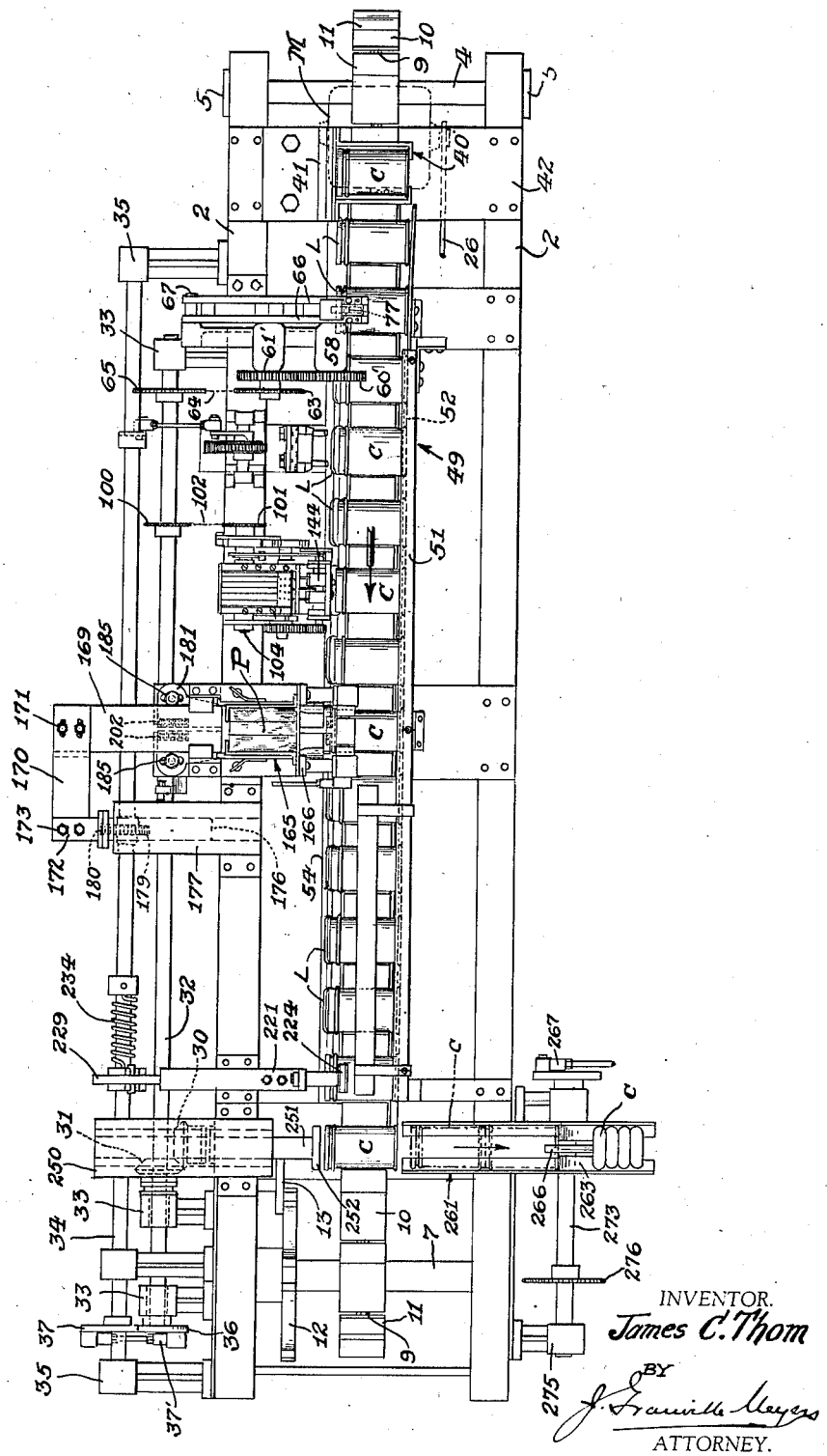

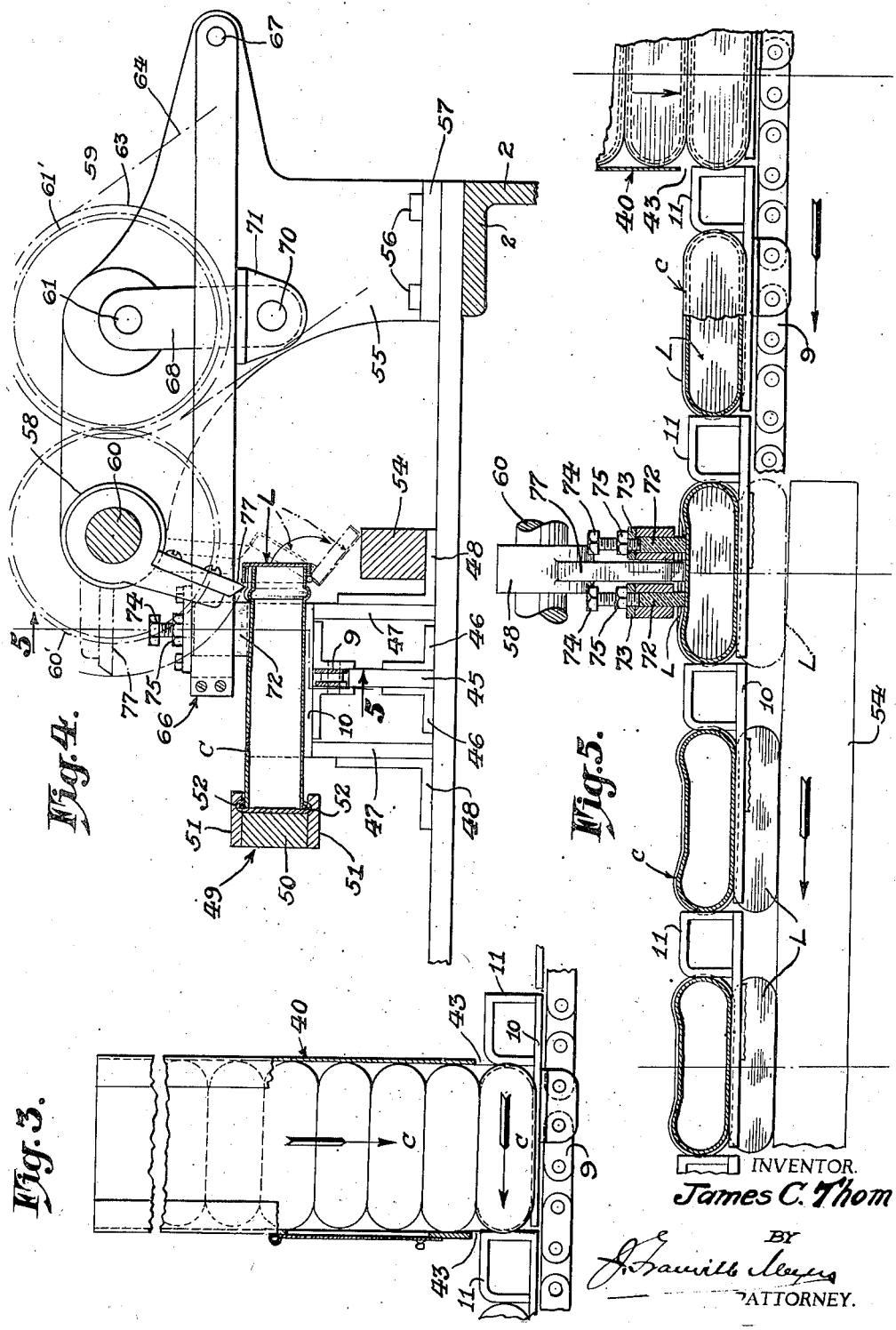

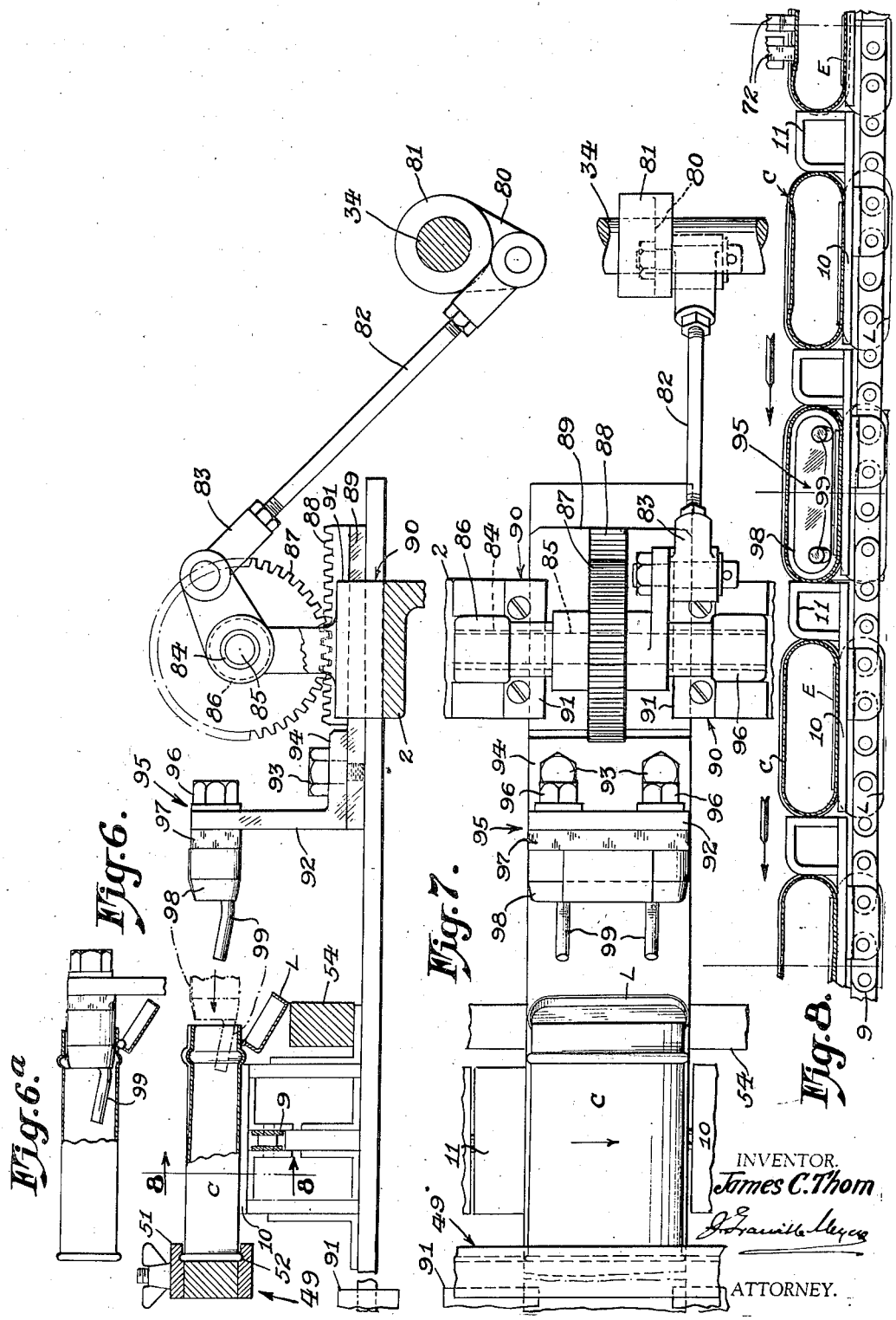

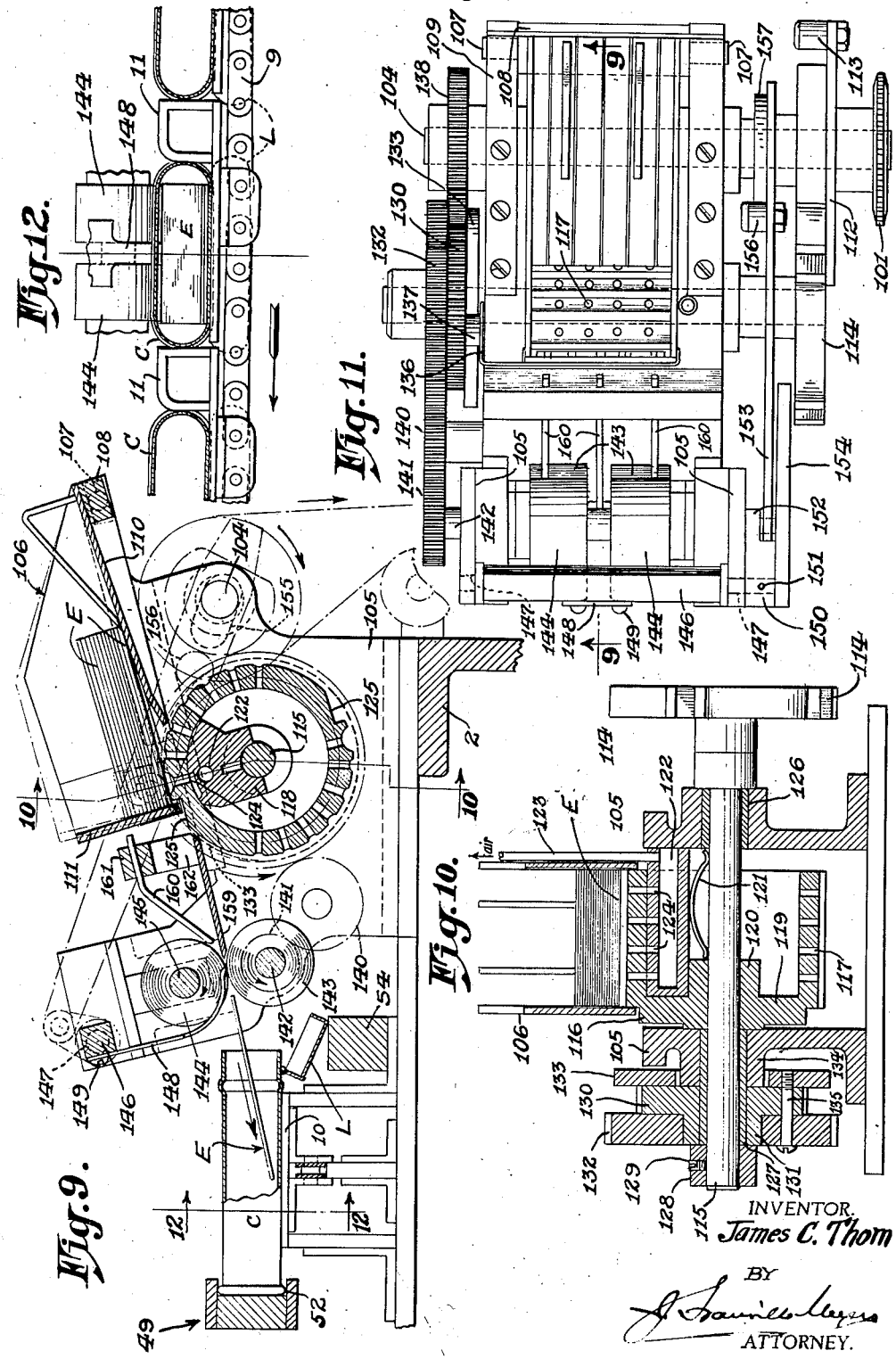

May 11, 1937. J. C. THOM 2,079,778
APPARATUS FOR INSERTING ARTICLES IN CONTAINERS
Filed Aug. 7, 1934 10 Sheets-Sheet 6
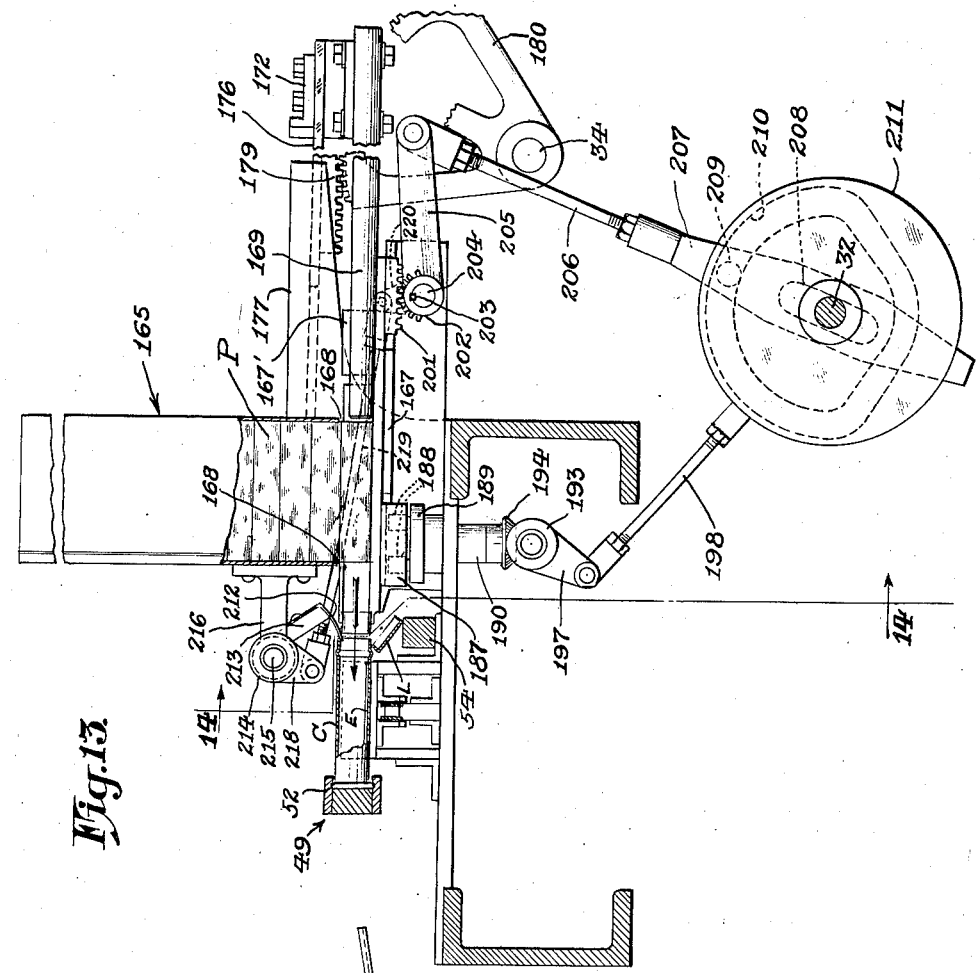
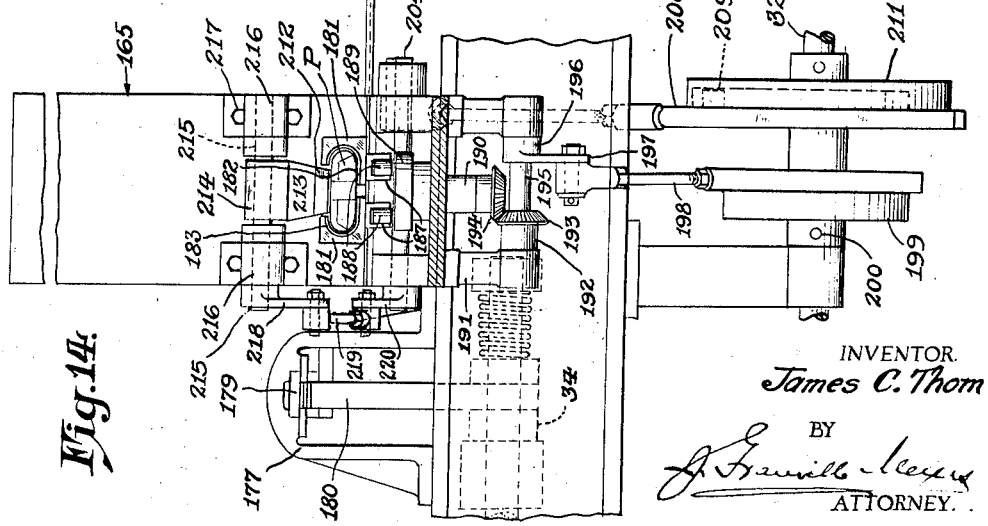
INVENTOR.
James C. Thom
BY
ATTORNEY.

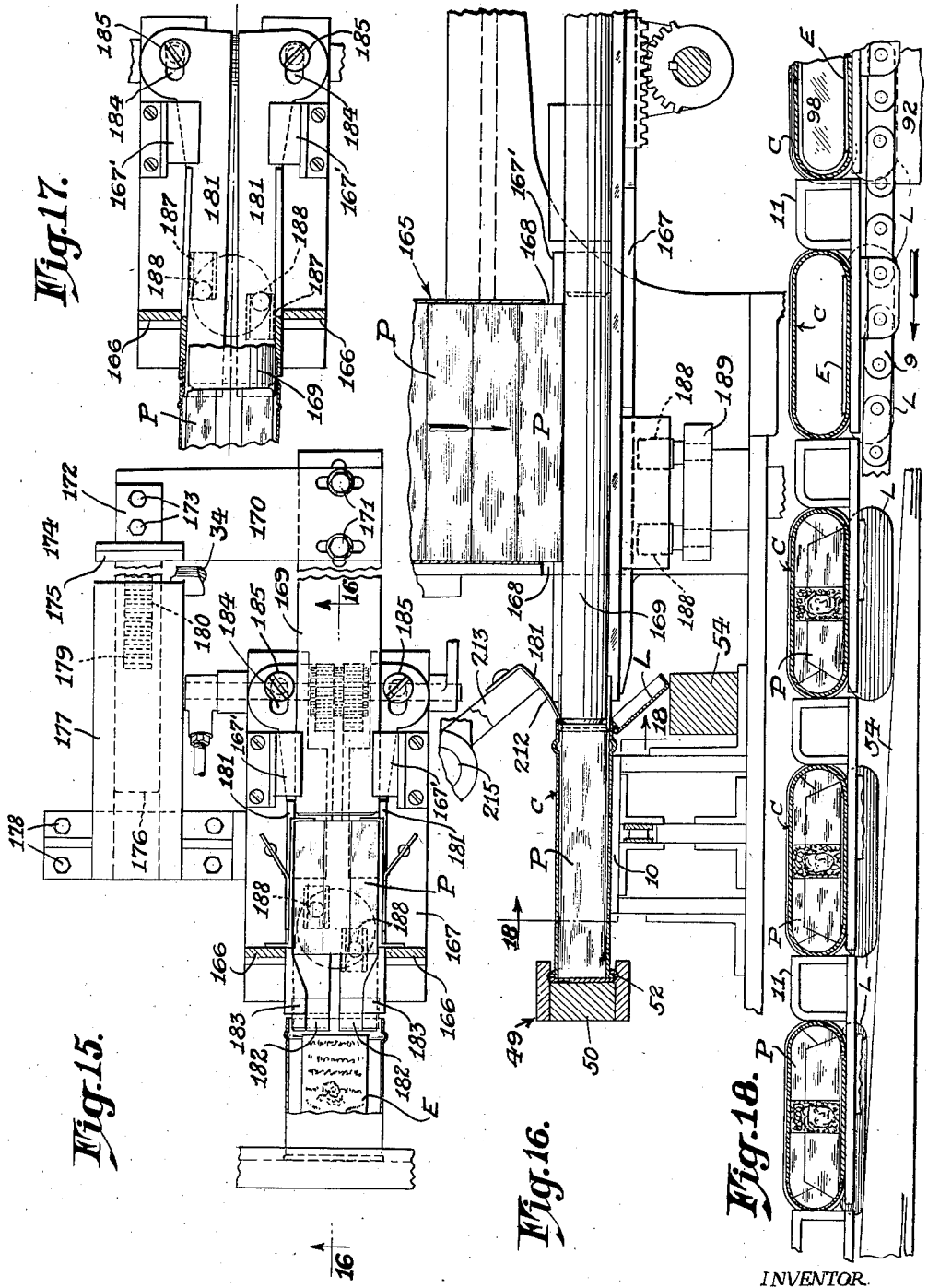

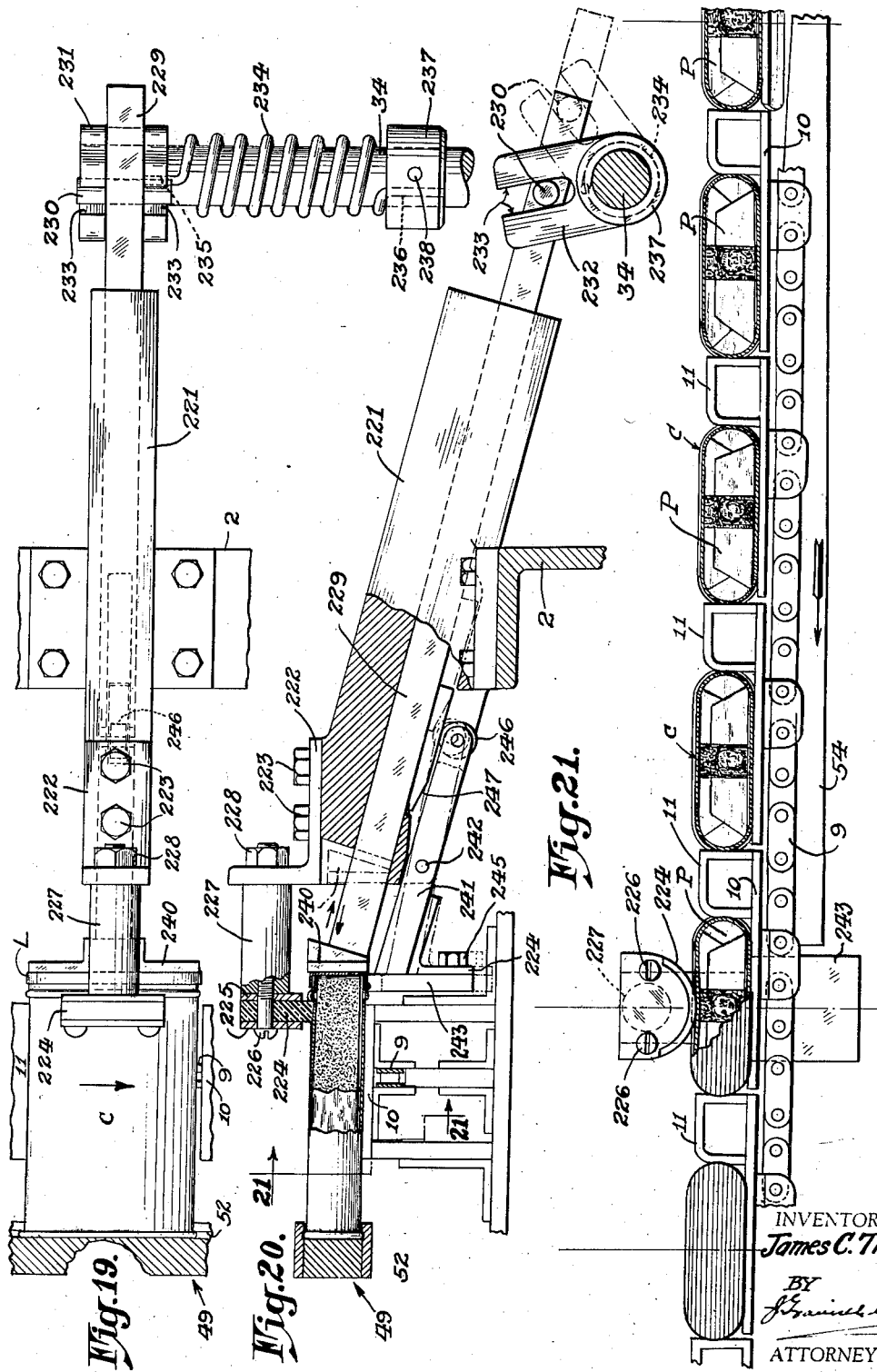

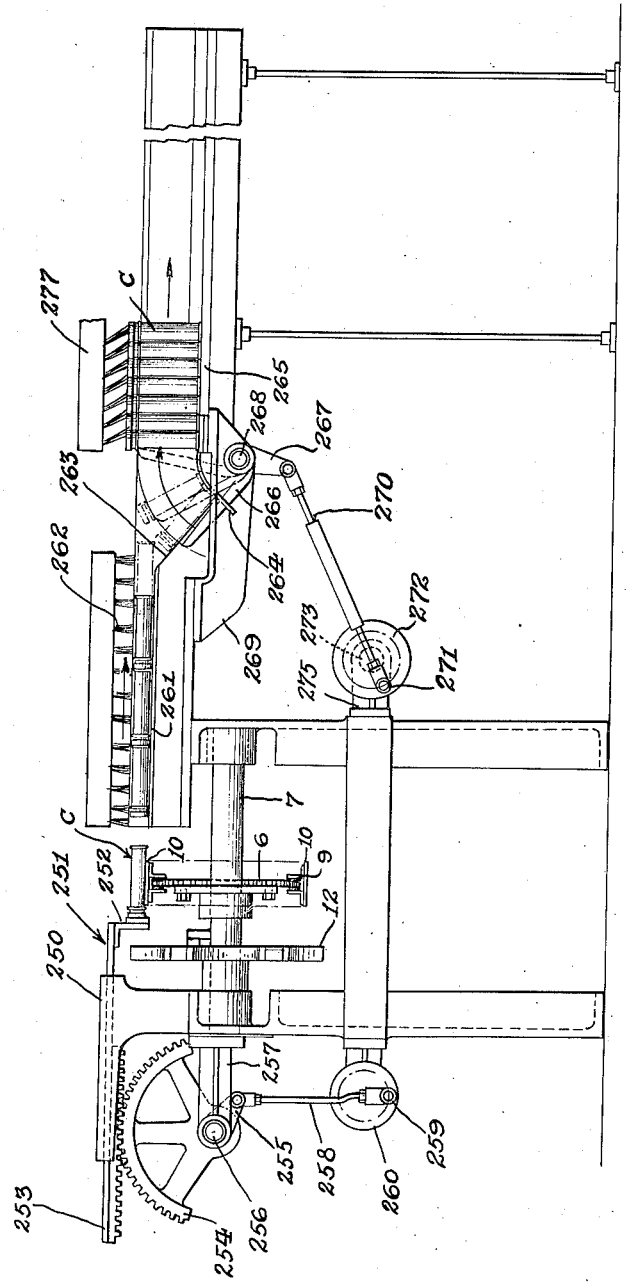

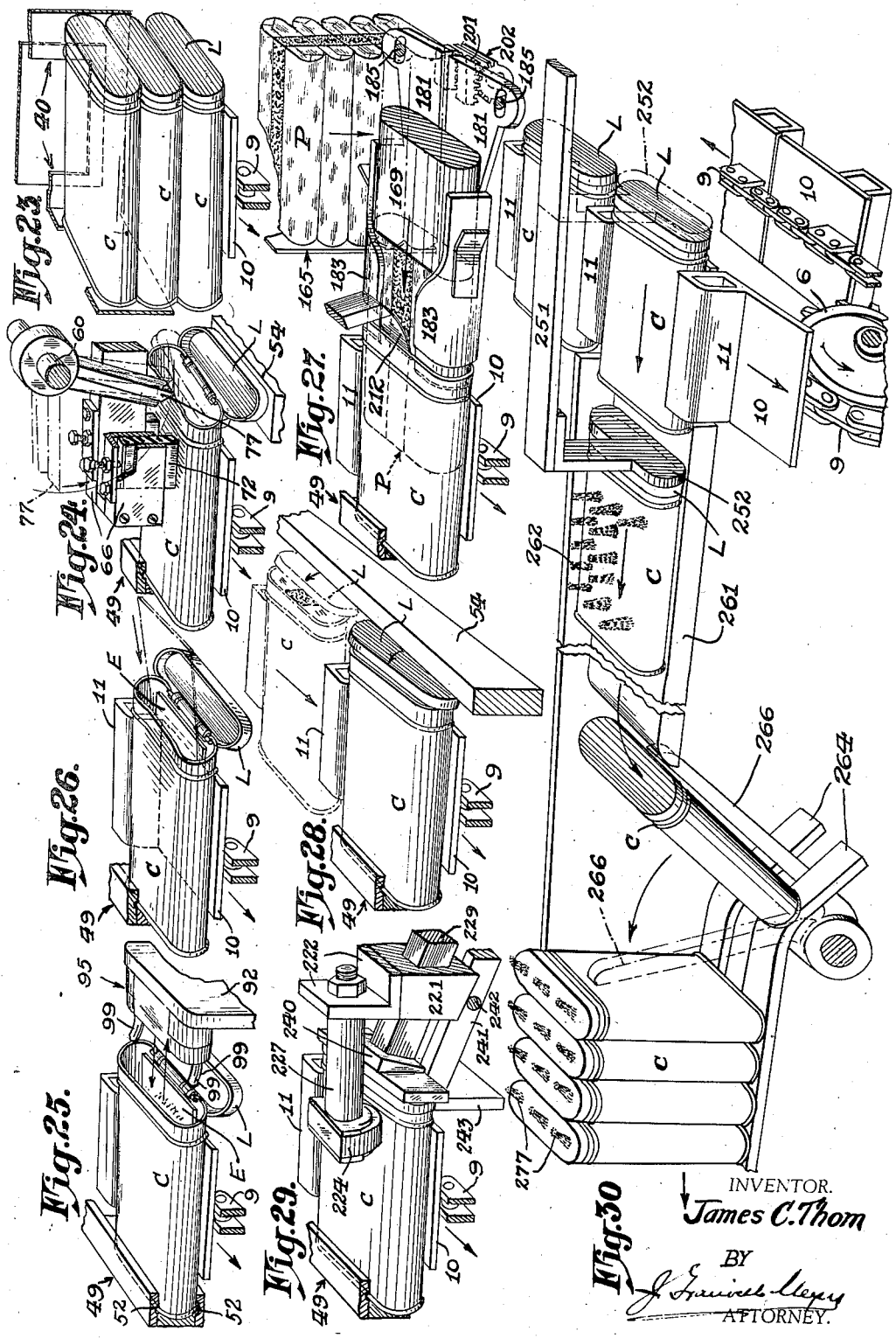

Patented May 11, 1937

2,079,778

UNITED STATES PATENT OFFICE 2,079,778

APPARATUS FOR INSERTING ARTICLES IN CONTAINERS

James C. Thom, Chicago, Ill., assignor to United States Tobacco Company, New York, N. Y., a corporation of New Jersey Application August 7, 1934, Serial No. 738,879

19 Claims. (Cl. 226—2)

My present invention relates to an automatic machine for inserting wrapped packages into outer receptacles.

In the illustrated embodiment of the invention I have shown and described a machine for inserting wrapped and stamped packages of tobacco into pocket tins of a conventional shape, and wherein the tins each have a hinged lid or cover.

The objects of the invention are to provide a machine of the kind referred to that is simple in construction, efficient in operation, and of relatively large capacity.

In the illustrated embodiment of the invention the machine includes a plurality of stations with means at the successive stations for performing the operations of first opening the lid of the receptacle or tin, then feeding a label thereinto, expanding or shaping the mouth of the tin to receive the package, feeding a package therein, and then closing the lid or cover of the tin or receptacle, combined with intermittently operating transporting means for advancing the tins or receptacles past or through the several stations where they are acted upon simultaneously and successively.

While the machine illustrated herein contains the several stations above referred to as well as others, it is obvious that certain of the stations may be omitted without departing from the spirit of the invention or affecting the operation of the machine or the mechanisms at the remaining stations. For instance, if the receptacle or tin to be filled does not have a hinged cover or lid, the lid or cover opening means as well as the lid or cover closing means may be dispensed with. It is also obvious that the station having means for feeding labels into the tins or receptacles may be omitted without in any way affecting the operation of the mechanisms at the other stations.

According to the plan of operation of the machine, all of the stations are preferably arranged in a straight line and in a single plane, and the receptacle transporting means is in the form of an endless conveyor having spaced pockets or supports to receive the tins or receptacles to be filled; and the means for driving the moving parts of the machine is such that the mechanism at all the stations will be operated simultaneously so that a plurality of cans or receptacles are acted upon at one and the same time, but in different stages, the operations being carried out successively at the different stations, as the receptacles or tins are fed successively into one end of the machine and successively discharged at the other end of the machine.

In order to enable others skilled in the art to understand, build and operate the said machine, I will now proceed to described the same in detail, reference being had for the purpose to the accompanying drawings, wherein:—

Fig. 1 is a front elevation of a machine embodying the present invention with the guide for the containers removed;

Fig. 2 is a top plan view of the same machine with the guide applied;

Fig. 3 is an enlarged fragmentary view partly in section showing the apparatus at station No. 1 for feeding the containers to the other conveyors;

Fig. 4 is a side elevation partly in section of mechanism forming parts of station No. 2 for opening the lids of the cans, taken on line 4—4 of Fig. 1;

Fig. 5 is a sectional view taken on the line 5—5 of Fig. 4;

Fig. 6 is a side elevation partly in section of mechanism forming part of station No. 3 for shaping or expanding the mouths of the cans, taken on line 6—6 of Fig. 1;

Fig. 6a is a detail view showing the expander within the mouth of the can;

Fig. 7 is a plan view of the mechanism shown in Fig. 6;

Fig. 8 is a view taken on the line 8—8 of Fig. 6;

Fig. 9 is a side elevation partly in section of mechanism for inserting labels in the cans, taken on line 9—9 of Figs. 1 and 11;

Fig. 10 is a view taken on the line 10—10 of Fig. 9;

Fig. 11 is a plan view of the mechanism shown in Figs. 9 and 10, with the labels removed;

Fig. 12 is a view taken on the line 12—12 of Fig. 9;

Fig. 13 is a side elevation partly in section of mechanism forming part of station No. 5 for inserting the packages within the cans, taken on line 13—13 of Fig. 1;

Fig. 14 is a view taken on the line 14—14 of Fig. 13;

Fig. 15 is a plan view of the mechanism shown in Fig. 13;

Fig. 16 is a view taken on the line 16—16 of Fig. 15;

Fig. 17 is a plan view of mechanism forming a part of station No. 5 for guiding the packages into the cans;

Fig. 18 is a view taken on the line 18—18 of Fig. 16;

Fig. 19 is a plan view of mechanism at station No. 6 for closing the can lids;

Fig. 20 is a side elevation partly in section of the mechanism shown in Fig. 19, taken on line 20—20 of Fig. 1;

Fig. 21 is a view taken on the line 21—21 of Fig. 20;

Fig. 22 is a side elevation partly in section of the mechanism forming a part of station No. 7 for delivering the closed cans and conveying them away from the machine, taken on line 22—22 of Fig. 1; and Figs. 23–30 inclusive are perspective views showing more or less diagrammatically the several steps performed.

Referring to Figs. 1 and 2 the numeral 1 designates the standards which support the frame or bed 2 of the machine. A sprocket wheel 3 is journaled on a shaft 4 at one end of the machine, which shaft is mounted in blocks 5 adjustably mounted between the side pieces of the frame 2. Another sprocket wheel 6 is journaled on a shaft 7 at the other end of the frame and a chain 9 is trained around the sprocket wheels for rotation thereby longitudinally of the frame. Secured to the chain at regular intervals are plates or supports 10 for the cans to be moved along the machine, each of the plates having an upstanding portion or end 11 to abut a side of the can as presently described. The shaft 7 is keyed to a Geneva gear 12 driven by a disc 13 provided with a lug 14 to engage with the teeth of the Geneva gear in known manner. The disc 13 is keyed to a shaft 15 also journaled between the sides of the frame 2 in the same manner as the shaft 7. The shaft 15 is also keyed to a sprocket wheel 16 around which is trained a chain 17. Another shaft 18 is journaled between opposite pairs of the supports 1 and is keyed to a sprocket wheel 19 around which the chain 17 is also trained. A pulley 20 is also keyed to shaft 18 and is driven by belt 21 from another pulley 22 on a shaft 23 journaled between the depending brackets 24 secured to the frame 2. Another large pulley 25 is keyed to the shaft 23 and is driven by belt 26 which in turn is driven by pulley 27 on motor M mounted on a support 28 beneath the frame and held in place by the supports 1 and rods 29.

The shaft 18 is also keyed to a beveled gear 30, the teeth of which mesh with another beveled gear 31 on an elongated shaft 32 journaled through bearings 33 at opposite ends of the frame. The shaft 32 rotates continuously, whereas the shaft 7 is rotated intermittently by the Geneva gear.

Another shaft 34 is journaled in bearings 35 and extends substantially parallel with the shaft 32. A cam disc 36 is keyed to shaft 32, and a rod 37' has one end connected to the cam disc 36 and its other end connected to a disc 37 keyed to the shaft 34, so that rotation of the shaft 32 will cause oscillating movement of the shaft 34, the oscillation of the shaft 34 being timed to provide for accomplishment of steps hereinafter pointed out in detail.

In Figs. 1, 2 and 3, I have shown a magazine 40 supported above the bed plate of the machine by any suitable means, such as bracket 41 secured to a cross plate 42 mounted between the sides of frame 2. The inner dimensions of the magazine 40 correspond substantially to the outer dimensions of the containers or cans C which are stacked therein. Opposite side walls of the magazine 40 terminate, as shown in detail in Fig. 3, above the plates 10 and projections 11 on the plates 10, so that there is provided a space 43 in the lower part of the magazine through which the plates and projections 11 pass as the chain is rotated. Obviously, each plate 10 when beneath the magazine will receive the lowermost container or can C with one side of the can abutting one of the projections 11 to be moved along with the chain and plates 10 as they progress. As the plates 10 move through space 43 they successively receive the lowermost cans and carry them along, it being obvious that the projections 11 prevent more than one can being deposited at a time. The mechanism just described comprises the apparatus at station No. 1 for feeding the cans to the conveyor or plates 10.

In practice, where hinged covered containers are to be filled, the containers are preferably stacked in the magazine with the hinged covers closed, and with the covers and hinge connection between the same and the cans all arranged in the same relative position. The next step to be performed is to open the covers to permit insertion of the packages or other articles in the manner hereinafter described.

The mechanism for opening the hinge covers is shown generally in Figs. 1 and 2 and in detail in Figs. 4 and 5. Referring to Fig. 4, it will be noted that there is a plate 45 held on the bed plate in vertical position by angle pieces 46. The top of the plate 45 serves as a guide for the chain 9 and the plates 10 ride on upstanding guide plates 47 also secured to the bed plate by angle pieces 48. At one side of the chain and plates 10, there is mounted along the forward edge of the frame an elongated guide 49, shown as comprising a center strip 50 and upper and lower plates 51 which project beyond the strip 50 to provide a groove 52 shaped to receive the beads on the bottom of the cans. This guide 49 extends from the feeding station above described to the discharge station hereinafter described. On the other side of the chain and plates 10, and adjacent the bed plate, there is a beam or strip 54 on which the covers of the cans ride after they have been opened and as the cans move on from station No. 2.

At the rear of the bed plate there is a bracket 55 secured to the bed plate as by bolts 56 which pass through the lower flange 57 of the bracket 55. The bracket 55 has at its forward upper end bearings 58 and 59 for shafts 60, 61, respectively. A gear 60' is keyed to the shaft 60 and meshes with a gear 61' keyed to the shaft 61. One end of the shaft 61, as shown best in Fig. 2, is keyed to a sprocket 63 around which is trained a chain 64 driven by a sprocket 65 on the rotating shaft 32. A pair of spaced arms 66 are pivotally connected at 67 to the rear of the bracket 55 and extend forwardly over the covered or upper ends of the cans being carried on plates 10. A link 68 is eccentrically connected at 69 to the shaft 61 and at its lower end is pivotally connected at 70 to a cross piece 71 which is secured to the arms 66. The forward ends of the arms 66 carry a pair of resilient blocks 72, which project beyond the lower surfaces of the arms 66. Plates 73 are provided on top of the arms, and extending therethrough are bolts 74 to adjust the position of the blocks 72, lock nuts 75 being provided on the bolts to hold them in adjusted position. To the shaft 60 there is connected for rotation therewith, a finger 77 having a beveled end 78 which has a sharp edge to engage the lids or covers L of the cans or containers.

From the foregoing, it should be clear that as the chains and plates 10 move a container from station No. 1 to station No. 2, the bead of the can slides along the groove in the guide 49, center strip 50 of which prevents longitudinal movement of the can at station No. 2. Also, when the can has arrived at station No. 2, the Geneva gear 12 is not rotating, so that the movement of the chains, plates 10 and cans carried thereby is halted. However, the shaft 32 is rotating so that the sprockets 65 and 63 and the chain therearound rotates shaft 61 and gears 61', 60' and shaft 60. Due to the crank connection between shaft 61 and the arms 69 by the links 68, the arms are rocked on the pivot 67 so that the resilient blocks 72 are brought down and push against the top of the can adjacent the cover to reduce the frictional fit between the cover and the can and slightly space them as shown in Fig. 4, so that as the finger 77 rotates with the shaft 60, its pointed end will engage the cover and swing it on its hinge, whereby the cover will be opened and fall onto the strip 54. It will be understood that the relative positions and movements of the arms 66 and finger 77 which engages the cover, are such that the finger engages the edge of the cover just after the blocks 72 have depressed the wall of the can. If the material from which the cans are made possesses very little resiliency the depressed wall may remain slightly depressed after the can leaves station No. 2, so I provide means at station No. 3 for reshaping or expanding the open mouth of the can.

The mechanism for reshaping or expanding the mouths of the can bodies is shown generally in Figs. 1 and 2, and more in detail in Figs. 6 and 7, wherein one arm of a crank 80 is shown provided with a collar 81 which is keyed to the main oscillating shaft 34, and the other arm of the crank 80 is connected to one end of the rod 82. The other end of the rod is connected to the arm 83 of a second crank, which is provided with a sleeve 84 mounted on a shaft 85, the ends of which are supported by sockets 86 mounted above the bed plate. A gear wheel or pinion 87 is keyed to the sleeve 84 and meshes with a rack 88 rigidly connected to a plate 89 which is mounted for sliding movement on the bed plate between guides 90 which are located at opposite sides of the plate 89, and which have portions 91 extending over the top of the plate 89 at opposite sides thereof. The forward end of the plate 89 has attached thereto a support 92 as by means of bolts 93, which engage through the base 94 of the support into the plate 89. The shaper or expander which is forced into the open ends or mouths of the cans is designated generally by the numeral 95 and is secured to the upper end of the support 92 by means of bolts 96 which engage through the upper end of the support and a resilient pad or cushion 97 and into the rear of the expander. The forward end 98 of the expander is beveled on all sides, so that the extreme front end of the expander is of considerably less cross sectional dimension than the mouths of the cans, whereby the expander may readily enter the cans. As the larger surface of the expander comes into contact with the mouth of the can, the mouth is expanded or shaped to facilitate insertion of the package at a subsequent station.

I preferably provide a pair of pins 99 on the lower forward edge of the shaper, the pins being inclined slightly upwardly. The purpose of these pins is to engage the covers in case they are not completely opened and to force them downwardly into complete open position as the expander enters the mouth of the can. It will be noted that the tips of the pins are located above the lower wall of the cans when the cans are brought into alinement with the shaper. The movements of the Geneva gear 12 which moves the can carriers, and the oscillation of the shaft 34 are such that the expander is moving forward when the cans on the supports 10 are at rest, and the expander is moving rearwardly away from the can when the cans are being carried forward.

It may be desirable to insert in the cans a label E or advertising matter, although this is entirely optional. In the present case, I have shown means for inserting the labels in the cans at station No. 4 and in details in Figs. 9-12 of the drawings. I wish it to be understood however, that not only is the employment of the label inserting mechanism optional, but that the same when used may occupy the position of the expanding or shaping mechanism, and that the expanding or shaping may be done after the labels are inserted. In other words, the relative position of stations 3 and 4 is optional.

In Fig. 2, the numeral 100 designates a sprocket on the constantly rotating shaft 32, around which and another sprocket 101 is trained a chain 102, the sprocket 101 is keyed to a shaft 104, which, and the parts about to be described, are best shown in detail in Figs. 9-12. The shaft 104 is journaled between the rear ends of the brackets 105 which are mounted on top of the frame. Above the brackets is the label supply magazine 106 which is pivotally supported by means of trunnions 107 on the end of a bar 108 secured to the bottom of the magazine, the trunnions engaging into openings in the rear ends of plates 109 extending rearwardly of the brackets 105 and supported thereby. The bottom 110 of the magazine normally rests on top of the brackets 105, and the bottom terminates short of the front wall 111 of the magazine providing an opening through which the labels are withdrawn from the magazine. The shaft 104 has keyed thereto a disc 112 carrying a roller 113, and a Geneva gear 114 is carried by a shaft 115, also journaled through the brackets 105 forwardly of the shaft 104. A cylinder 116 having two diametrically spaced groups of perforations 117 is keyed to the shaft 115 for rotation therewith. A sucker head 118 is mounted within the cylinder beneath the discharge opening in the magazine between one of the brackets 105 and the groove 119 provided in the cylinder by a boss 120, and is normally urged upwardly into frictional engagement with the inner surface of the cylinder by spring 121 which bears against the shaft 115 and the under surface of the sucker head. The interior of the sucker head has a chamber 122 connected by a pipe 123 with evacuating apparatus of any suitable type, not shown. The sucker head is also provided with spaced openings 124 in alinement with the openings 117 of the cylinder and communicating with the chamber 122. As shown best in Fig. 9, the cylinder also has diametrically opposite notches 125 in its outer surface, there being one just in advance of each of the groups of perforations 117. When the magazine is in its normal or lowered position, the forward wall 111 is disposed in one of the notches 125.

As shown best in Fig. 10, the shaft 115 extends through bushings 126 and 127 and a collar 128 is locked to the outer end of the shaft by key 129. A gear 130 is journaled on the bushing 127 and is provided with a sleeve 131 which receives another gear 132. A cam disc 133 is journaled around the boss 134 on one of the brackets 105, and the gears 132, 130, and cam disc 133 are held together for rotation by a screw 135. As shown best in Fig. 11, the forward end of the magazine has secured thereto a plate 136 to carry a lug or roller 137 which rests on the cam disc 133, so that the forward end of the magazine will be raised and lowered when the cam disc 133 rotates to lift the wall 111 out of the notches 125 and above the outer surface of the cylinder 116.

The shaft 104 has keyed thereto a gear 138 which meshes with the gear 139 to rotate the gears 130, 132 and cam disc 133. The gear 132 meshes with a gear 140 which in turn meshes with a gear 141 keyed to a shaft 142 which is journaled between the forward ends of the brackets 105. On the shaft 142 are a pair of rollers 143 spaced apart and alined with the magazine, the combined width of the rollers and the space therebetween being substantially the same as the width of the labels to be fed into the cans. These rollers are normally in contact with another and similar pair of rollers 144 journaled on a shaft 145, also journaled between the forward ends of the brackets 105. Above the rollers 144 and between the brackets 105 is mounted a beam 146, the outer ends of which have trunnions 147 journaled in the upper ends of the brackets 105. A metal strip 148 is secured to the front of the beam 146 as by screws 149, and the lower end of the strip 148 is curved inwardly and bent to form a lip disposed in the space between the rollers 144.

One of the trunnions 147 extends through one of the brackets 105 and is keyed to a crank 150 as at 151. This crank is provided with a lug 152 which receives one end of the lever 153 which is disposed between the reduced end of the crank and plate 154. Adjacent its other end the lever 153 is slotted as at 155 to receive the shaft 104 and also carries a roller 156 disposed in front of the cam 157 which is keyed to the shaft 104.

The operation of the label feeding mechanism at station No. 4 which has just been described is as follows: When a can is presented in front of station No. 4 with its open mouth in alinement with the magazine and feed rollers 143 and 144, the magazine is rocked on its pivot 107 to raise the front wall 111 out of one of the notches 125, immediately after which the Geneva gear 114 is given a one-half revolution by the lug or roller 113 on the disc 112 successively passing one group of ports 117 in the cylinder 116 past the ports 124 in the sucker head 118 withdrawing the lowermost label. As the ports 117 successively pass the ports 124, the front end of the label is released and it is passed down a plate 159 between the cylinder and the rollers 143, 144, and the front of the label is eventually gripped by the rotating rollers 143, 144 and passed therebetween partially into the can. As the rear edge of the label passes between the rollers 143, 144, the cam 157 actuates the roller 156 on the lever 153 to cause the crank 150 to impart a quick partial rotative movement to the trunnions 147 and beam 146, so that the lip on the strip 148 pushes the label completely into the can.

It should be apparent that the rollers 143 and 144 are constantly rotated by the gears 141, 140, 132; while the Geneva gear 114 rotates the shaft 115 intermittently; and that the construction of the cam 133 is such that the magazine is rocked on its pivot in synchronism with the rotation of the cylinder 116. If desired a plurality of resilient fingers 160 may be supported above the plate 159 with their lower ends adjacent the plate to assist in guiding the labels between the feed rollers, and the fingers may be supported by beam 161 supported by uprights 162 at opposite sides of the plate 159.

The mechanism for inserting the packages into the cans is located at station No. 5 and is shown generally in Figs. 1 and 2 and in detail in Figs. 13-18. The magazine designated generally by the numeral 165 is supported above the frame or bed of the machine by brackets 166 which are attached to the side walls of the magazine and to parts of the frame. The front and rear walls of the magazine terminate above the plate 167 providing spaces 168 of a height substantially the same as the thickness of the packages P, so that the packages may be pushed successively into the cans which are brought into alinement with the magazine from the preceding stations. In the present instance, the packages shown are tobacco packages wrapped in paper and moisture proof outer wrapper, but of course other types of packages or articles may be inserted.

In alinement with the openings 168 there is a pusher or plunger 169 slidably mounted through guides 167', and attached at its rear to a cross piece 170 as by bolts 171; and the other end of the cross piece 170 is attached to a coupling 172 by bolts 173. The coupling 172 has a flange 174 which is secured to a similar flange 175 on a plate 176 which is slidably mounted through a guide 177 secured to the frame by bolts 178. The undersurface of the plate 176 is provided with a toothed rack 179 which meshes with the teeth of a toothed segment 180 keyed to the oscillating shaft 34, as shown best in Figs. 13 and 14. Obviously, oscillation of the segment 180 with the shaft 34 reciprocates the rack 179 and consequently the plate 176, cross piece 170 and pusher 169 a predetermined distance which is sufficient to move the packages from the magazine into the cans.

I also provide means for guiding the packages during their movement into the cans and for facilitating their entrance into the cans. One part of the guiding means comprises what I term a "duck bill" in the nature of a pair of blocks 181, each having a thin forward end with a flat bottom portion 182 between which and the small flat portion 183 on the top is a curved side wall of substantially the same curvature and dimension as the interior of the cans. The blocks 181 have slots 184 at their rear ends through which are mounted bolts 185 which engage into plates 186 so that the blocks 181 are pivotally mounted, whereby the forward ends or duck bill may be moved toward and away from each other.

Each of the blocks 181 has a depending channel 187, shown best in Fig. 14, and each channel receives a lug or roller 188 on a disc 189 which is keyed to a shaft 190 journaled through the bed plate, the lower surface of the disk 189 resting on top of the bed plate. The bed plate also has depending brackets 191, and the lower end of one of the brackets forms a journal for a tubular shaft 192 carrying a beveled gear 193 meshing with a similar gear 194 on the shaft 190. A shaft 195 is keyed to the tubular shaft 192 and to the sleeve 196 on crank 197 which is journaled in the other bracket 191. The crank 197 is connected to a rod 198, the lower end of which is provided with a lug, not shown, seated in the cam slot in disc 199 which is keyed as at 200 on a constantly rotating shaft 32. Obviously, the rod 198 oscillates the crank 197 in known manner to oscillate the shaft 195 and consequently shaft 192 and through gears 193 and 194, the shaft 190 and disc 189. This oscillating movement causes the rollers 188, due to their engagement with the channels 187, to swing the blocks 181 toward and away from each other on their pivots 185.

Besides the oscillating movements of the duck bill, I also provide a reciprocating movement thereto so that the bill is inserted in the mouth of the can and withdrawn therefrom. This is accomplished by means of a rack 201 connected with the plates 186. The teeth of the rack mesh with the teeth of a pinion 202 keyed at 203 to shaft 204 which is connected to a crank 205 in turn connected to a rod 206. A plate 207, which is provided with a slot 208 receiving the oscillating shaft 32, and also with a lug 209 projecting into cam slot 210 of the cam disc 211, is connected to rod 206. The cam 211 is keyed to shaft 32.

The construction and arrangement of the parts for oscillating and reciprocating the duck bill are such that the duck bills are contracted or brought toward each other as they enter the can and then expanded while the package is being inserted therethrough, after which the duck bills are withdrawn.

Another feature of the mechanism for inserting the packages in the cans at station No. 5 is the curved plate 212 which operates between the tops of the duck bills, that is, in a space between the duck bills. This plate is carried by an arm 213 which is provided with a hub 214 keyed to a shaft 215, which is journaled through the upper ends of brackets 216 secured to the frame or bed plate by bolts 217. One end of the shaft 215 is connected to a crank 218 which is connected by a coupling 219 with another crank 220 on the shaft 204. The operation of the plate 212 is such that it engages under the upper wall of the can in the space in the duck bill just prior to and during the insertion of the package. It is believed that the foregoing detailed description of the construction and operation of the parts of station No. 5 is sufficient to a full understanding of the operations which take place during the inserting of the packages in the cans, but I would briefly state that the duck bill and plate 212 enter the mouth of the can at substantially the same time and provide a positive guide for the insertion of the packages, so that the packages will not contact the edges of the cans when they are inserted by the pusher 169.

After the packages are inserted the next step is to close the covers and this is finally accomplished at station No. 6 although part of the closing operation takes place between stations 5 and 6. As shown in Fig. 2, there are four cans between the one at station No. 5 and the one at station No. 6, whereas between the preceding stations there is only one can. The reason for the longer distance between stations 5 and 6 is that the beam 54 on which the lids rest as they are carried along, gradually rises between stations 5 and 6, that is, the upper surface of the beam is inclined upwardly between stations 5 and 6, so that the lids riding thereon are partly closed.

To complete the closing I provide the means at station No. 6 shown generally in Figs. 1 and 2 and in detail in Figs. 19-21. In these views the numeral 221 designates a block supported on the frame 2 by any suitable means and inclined downwardly from the forward part of the machine to the rear. To the upper forward end of the block is secured an angle plate 222 as by means of bolts 223 and the vertical arm of the plate supports a resilient block 224 which is disposed above the cans as they move to station No. 6. The lower surface of the block is located to contact the upper walls of the cans and bend them slightly downward to facilitate closing of the covers. The block 224 is located between plates 225 and elongated screws 226 extend through the plates, block 224, spacer 227, and the vertical wall of the plate 222, receiving a nut 228 to hold the parts together. The block 221 is provided with an opening through which extends a rod 229 provided adjacent its rear end with a pair of lugs 230 on its opposite sides. A collar 231 is journaled on the shaft 34 and is provided with two pairs of arms 232, having therebetween notches 233 at opposite sides of the rod 229 to receive the lugs 230. A coil spring 234 surrounds the shaft 34 and has one end of its ends anchored in one of the arms 232, as designated by the numeral 235, and its other end 236 anchored in a collar 237 keyed to the shaft 34 at 238. Obviously oscillation of the shaft 34 imparts a reciprocating motion to the rod 229 through the action of the spring 234 and the turning of the collar 231 and arms 232 from the full line to the dotted line position of Fig. 20. The forward end of the rod 229 is provided with a head 240 to push the lids closed.

As previously mentioned, the lids are partly closed as they move between stations 5 and 6. When they arrive at station No. 6 they are further closed by means of lever 241 pivotally mounted at 242 on a depending part of the block 221. The forward end of the lever 241 has secured thereto an upright plate 243 as by means of an angle plate 244 and bolts 245. The rear end of the lever 241 carries a roller 246 and the lower part of the rod 229 carries a cam block 247 which engages the roller to rock the lever 241 and raise and lower the plate 243. As the plate 243 rises it engages the lower corner of the partly closed lids and swings them further into closed position, so that the head 240 can completely close the lids.

After the packages have been inserted in the cans and the lids have been closed as above described, the cans are moved to station No. 7 to be removed from the carriers and conveyed for packing. The mechanism constituting station No. 7 is shown generally in Fig. 2 and in detail in Figs. 22 and 30. Guide 250 is secured to the rear of the frame and receives a pusher 251, the forward end of which has a depending head 252 to engage the cans, and the rear of the pusher is provided on its underside with a rack 253, the teeth of which mesh with the teeth of a segment 254 which is connected to a crank 255 journaled on a shaft 256 rotatably supported by the outer ends of brackets 257. The crank 255 is connected to the upper end of a rod 258, the lower end of which is connected to a lug 259 on a disc 260 which is driven by the shaft 32. Obviously oscillation of the segment 254 reciprocates pusher 251 causing it to move forward each time a plate 10 is arranged and at rest in alinement with the pusher, so that the head 252 will engage the can and move it off of the plate 10 onto a bed 261. Above the bed 261, I preferably provide an elongated brush 262 with the bristles spaced from the bed 261 and providing in conjunction therewith a channel through which the cans are moved. Obviously, the bristles of the brush prevent the cans from raising during their forward movement. The bed 261 is preferably of a length to receive a plurality of cans, whereby the outermost can is moved by the succeeding cans as they are moved into the channel by the pusher 251. The forward end of the bed 261 terminates in an inclined wall 263 which is substantially the same width as the width of the cans, and which is also bifurcated. A pair of curved plates 264 extend through the opening in the wall 263 and at their upper ends are connected to a support 265. These plates 264 act as a stop against which the bottoms of the cans engage when they slide down the inclined wall 263. The plates 264 also act as a guide when the cans are raised to the vertical position on the support 265.

To accomplish the raising of the cans from the inclined position on the walls 263 to upright position on the support 265, I provide between the plates 264 an arm 266 which is connected to a crank 267 pivotally mounted at 268 on a bracket 269 beneath the frame. The crank 267 is connected to one end of rod 270, the other end of which is connected to a lug 271 on a wheel 272 which, as shown in Fig. 2, is keyed to and driven by a shaft 273. The shaft 273 is journaled through suitable bearings 275 on the front of the frame and has keyed thereto a sprocket wheel 276 which may be driven from any constantly rotating parts such as the shaft 32. Above the support 265 is a brush 277, the bristles of which engage the tops of the cans and maintain the cans in upright position as they are moved along the support.

It should be obvious that the operation of the mechanism at station No. 7 is as follows: When a can arrives in alinement with the pusher 252, the pusher moves the can from the plate 10 onto the bed 261, and under the construction shown in the drawings when four cans have been successively moved onto the bed, the first one slides down the inclined wall 263 with its end resting against the plates 264. After the can has come to rest on the inclined wall the arm 266 swings it through the arc indicated by the arrow in Fig. 22 to upright position on the support 265 beneath the brush 277. As the cans successively are moved in the manner described, they form a line beneath the brush 277 which progressively moves forward.

The various operations are shown diagrammatically in Figs. 23–30 from the feeding of the cans to the plates or carriers 10 in Fig. 23, the opening of the lids in Fig. 24 and a subsequent inserting of the label, shaping of the mouth, inserting of the package, closing of the lids and discharge of the cans.

I claim:

1. Packaging apparatus for inserting articles or packages in containers of the hinged cover type, comprising a support, a carrier movable along said support and having means for engaging and advancing containers along said support, with the cover hinge at the bottom of the container end, means for intermittently operating the carrier to move said containers to a plurality of successive stations on the support, for successive operations on the containers, means located at one station to feed the containers successively to the carrier with their covers closed and projecting beyond a side of the carrier, means located at another station and operating transversely to the direction of movement of the carrier and container and movable downwardly and longitudinally of the containers to engage and open the covers of the containers while on the carrier, means to prevent movement of the containers during the opening of the covers, means located at a third station to insert the articles or packages in the containers while the covers are open, and subsequently operating means located adjacent the path of movement of the carrier to close the covers of the containers while on the carrier.

2. In apparatus for inserting articles or packages into containers of the type having a closed end with a bead therearound and an open end with a hinged cover, carrier means for a succession of the containers, means to feed the containers successively to the carrier with their covers closed, means to open the covers of the containers while on the carrier, means receiving the beads to hold the containers against movement during opening of the covers, means to insert the articles or packages in the containers while their covers are open, means to subsequently close the covers of the containers while on the carrier, and means to move the filled containers from the carrier.

3. In apparatus for inserting articles or packages in containers of the hinged cover type, a carrier to progressively move a succession of the containers in a common direction, means for operating said carrier to move said containers to a plurality of successive stations for successive operations thereon, means, located adjacent one station of the carrier, to open the covers of the containers while on the carrier, a support along which the open covers move, means located at another station of the carrier to insert the articles or packages in the containers, said support beyond the point where the articles are inserted being formed to partially close the covers of the containers while on the carrier after the articles or packages have been inserted, and means to complete the closing of the covers, said last named means being located at a third station of the carrier.

4. In apparatus for inserting articles or packages in containers of the hinged cover type, a carrier to progressively move a succession of the containers in a common direction, means engageable with a wall of the container adjacent the cover to depress the wall at the mouth of the container, means to open the cover of the container when said wall is depressed, means insertable into the open end of the container to expand or reshape the mouth after said cover is opened, and means to insert the articles or packages in the mouth of the container.

5. In apparatus for inserting articles or packages in containers of the hinged cover type, a carrier to progressively move a succession of the containers in a common direction, means engageable with a wall of the container adjacent the cover to depress the wall at the mouth of the container, means to open the cover of the container when the wall is depressed, means insertable into the open end of the container to expand or reshape the mouth after the cover is opened, means to insert the articles or packages in the mouth of the container, and means to close the covers of the containers while on the carrier after the articles or packages have been inserted.

6. In apparatus for inserting articles or packages into containers of the hinged cover type, a carrier to progressively move a succession of the containers in a common direction, means to open the covers of the containers, means operable during operation of said opening means to reduce the frictional fit between the bodies of the containers and the covers at the mouths of the containers, means to insert the articles or packages into the containers through the open mouths, means to close the covers, and means to partially compress the mouth of the container during closing of the covers.

7. In apparatus for inserting articles or packages into containers of the hinged cover type, carrier means to receive and move a succession of the containers in a common direction, means to open the covers of the containers on said carrier, means operable during operation of said opening means to reduce the frictional fit between the bodies of the containers and the covers at the mouths of the containers by depressing a wall of the container, means to reshape the open mouths of the containers after depression of said wall, means to insert labels or the like into the mouths of the container, means to insert the packages or articles into the containers, means to close the covers of the containers after insertion of the labels and packages, and means to discharge the containers from the carrier after the covers have been closed.

8. In apparatus of the character described including a carrier for containers of the hinged cover type, mechanism for opening the covers of the containers and to which the containers are moved with their covers closed, comprising, a member above the carrier, means to move said member up and down whereby the latter movement causes said member to engage and depress a wall of the container bodies to reduce the frictional fit between the cover and body of the container, a cover engaging member, and means to move said cover engaging member against the edge of the covers to swing them open when the wall is depressed.

9. In apparatus of the character described including a support for containers of the hinged cover type, mechanism for expanding or shaping the mouths of the containers when the covers are open comprising, a member to fit within the mouths of the containers, means to reciprocate said member to move it into and out of the mouths of the containers, and means carried by and operable in advance of the entrance of said member into the mouths of the containers to move the covers to further open position if not already sufficiently opened to admit said member into the mouth.

10. In apparatus for inserting articles or packages into containers, a support for the containers, a support for the articles or packages, a pusher to move the packages or articles in individual units along their support and into the containers, a guide through which the packages or articles and pusher move into the containers, means for inserting and withdrawing said guide into and out of an open end of the containers in synchronism with the movements of the pusher, means for expanding said guide as the guide moves into the container and for contracting said guide as the guide is withdrawn from the container, and an oscillating member movable in synchronism with said guide into and out of the open ends of the containers under a wall of the containers intermediate said opposite sides.

11. In apparatus for inserting articles or packages into containers of the hinged cover type, a carrier for a succession of the containers, means operable transversely to the direction of movement of the carrier and containers thereon to open the covers of the containers while on the carrier, means embracing the ends of the containers opposite said covers to prevent movement of the containers in the direction of the opening movement of the covers during operation of the cover opening means, said embracing means forming a guide for the containers during the movement of the containers and carrier and means to insert the articles in the open ends of the containers.

12. In apparatus for inserting articles or packages into containers of the hinged cover type, a carrier for a succession of the containers, means operable transversely to the direction of movement of the carrier and containers thereon to open the covers of the containers while on the carrier, means embracing the ends of the containers opposite said covers to prevent movement of the containers in the direction of the opening movement of the covers during operation of the cover opening means, said embracing means forming a guide for the containers during the movement of the containers and carrier means to insert the articles in the open ends of the containers, and means to subsequently close the covers of the containers while on the carrier.

13. In apparatus for inserting articles or packages into containers of the hinged cover type, a carrier for a succession of the containers, means operable transversely to the direction of movement of the carrier and containers thereon to open the covers of the containers while on the carrier, fixed, oppositely disposed means embracing and forming a guide for the containers during the movement of the containers and carrier the ends of the containers opposite said covers to prevent movement of the containers in the direction of the opening movement of the covers during operation of the cover opening means, means to insert the articles in the open ends of the containers, means to partially close the covers during movement thereof along with the carrier and containers at a point beyond the article inserting means, and means to complete closing of the covers from said partially closed position.

14. In apparatus for inserting articles or packages in containers of the hinged cover type, a carrier to progressively move a succession of the containers in a common direction, means for operating said carrier to move said containers to a plurality of successive stations for successive operations thereon, means located at one station of the carrier operable transversely to the movement of said carrier and containers and engageable with the covers to open them, a support along which the open covers move, means located adjacent another station of the carrier to insert the articles or packages in the open ends of the containers, said support for the covers beyond the point where the articles are inserted being formed to partially close the covers as they move therealong, and means located adjacent a third station engageable with the ends of the covers in their partially closed position to complete closing thereof.

15. In apparatus of the character described, an endless conveyor, elements on the conveyor spaced from each other to provide pockets to receive containers of the hinged cover type, a magazine to receive the containers with their covers closed and through which the conveyor moves, means to intermittently move the conveyor to cause the containers to be successively deposited on said conveyor in said pockets in horizontal position with the hinged covers extending beyond one edge of the conveyor, means operable transversely to the movement of said conveyor to open said covers, and channel means embracing and guiding the ends of the containers opposite to said covers to prevent endwise movement of the containers when the covers are being opened.

16. In apparatus of the character described, an endless conveyor, elements on the conveyor spaced from each other to provide pockets to receive containers of the hinged cover type, means for operating said conveyor to move said containers to a plurality of successive stations for successive operations thereon, a magazine to receive the containers with their covers closed and through which the conveyor moves, means to intermittently move the conveyor to cause the containers to be successively deposited in said pockets, means located at one station of the conveyor and beyond said magazine operable transversely to the movement of said conveyor and movable downwardly and longitudinally of the containers to engage and open said covers, means, located at another station of the conveyor, to insert articles or packages in the open ends of said containers, and means, located adjacent the subsequent path of movement of the conveyor, engageable with said covers to partially close them during movement thereof on the conveyor after the articles or packages have been inserted.

17. In apparatus of the character described, an endless conveyor, elements on the conveyor spaced from each other to provide pockets to receive containers of the hinged cover type, a magazine to receive the containers with their covers closed and through which the conveyor moves, means to intermittently move the conveyor to cause the containers to be successively deposited in said pockets, means beyond said magazine operable transversely to the movement of said conveyor to engage and open said covers, means to insert articles or packages in the open ends of said containers, means engageable with said covers to partially close them during movement thereof on the conveyor after the articles or packages have been inserted, and reciprocating means engageable with the ends of the covers to complete closing thereof while on the conveyor.

18. In apparatus of the character described, an endless conveyor, elements on the conveyor spaced from each other to provide pockets to receive containers of the hinged cover type, a magazine to receive the containers with their covers closed and through which the conveyor moves, means to intermittently move the conveyor to cause the containers to be successively deposited in said pockets, means beyond said magazine operable transversely to the movement of said conveyor to engage and open said covers, means to insert articles or packages in the open ends of said containers, reciprocating means engageable with said covers to close them after the articles or packages have been inserted, and means operable transversely to the movement of the conveyor to remove the closed containers therefrom.

19. In apparatus of the character described, an endless conveyor, elements on the conveyor spaced from each other to provide pockets to receive containers of the hinged cover type, a magazine to receive the containers with their covers closed and through which the conveyor moves, means to move the conveyor through said magazine to cause the containers to be successively deposited in said pockets in horizontal position with the hinged connection between the covers and containers located beyond one side of the conveyor, means engageable with the top walls of the containers when on said conveyor and adjacent the covers to depress the wall and reduce frictional fit between the containers and covers, means to open the covers when said walls are depressed, and means insertable into the open ends of the containers to re-shape said wall.

JAMES C. THOM.